(12) United States Patent
Korinek (10) Patent No.: US 10,060,461 B2
(45) Date of Patent: Aug. 28, 2018

(54) DISPLAY APPARATUS

(71) Applicant: Apple Inc., Cupertino, CA (US)

(72) Inventor: Michael Korinek, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 13/797,383

(22) Filed: Mar. 12, 2013

(65) Prior Publication Data
US 2014/0262930 A1    Sep. 18, 2014

(51) Int. Cl.
| B65D 5/50 | (2006.01) |
|---|---|
| B65D 5/46 | (2006.01) |
| F16B 11/00 | (2006.01) |
| B65D 5/42 | (2006.01) |

(52) U.S. Cl.
CPC .......... *F16B 11/006* (2013.01); *B65D 5/4208* (2013.01)

(58) Field of Classification Search
CPC .............. B65D 2203/00; B65D 33/001; B65D 5/4208; B65D 5/4225; B65D 5/4229; B65D 5/5226; B65D 73/0064; B65D 75/54; B65D 505/54665; B65D 5/54; B65D 5/46032; Y10S 206/806
USPC ....... 16/407; 206/459.5, 736, 767, 803, 806; 229/117.19, 117.23, 120.17, 123.3, 222, 229/225, 232; 248/300, 205.3; 294/212, 294/219, 27.1; 40/312, 313; 53/492
See application file for complete search history.

(56) References Cited

U.S. PATENT DOCUMENTS

| | | | | |
|---|---|---|---|---|
| 2,846,134 A * | 8/1958 | Moubayed | ............. | B65D 33/10 229/117.26 |
| 3,380,181 A * | 4/1968 | Karel | ..................... | B65D 5/067 40/312 |
| 3,638,853 A * | 2/1972 | Perry | ..................... | B65D 5/541 229/132 |
| 4,412,619 A * | 11/1983 | Van Laer | ........... | B65D 5/46088 229/117.14 |
| 5,145,108 A * | 9/1992 | Pinckney | ................ | B65B 61/14 229/117.23 |
| 5,186,542 A * | 2/1993 | Seabold | ............. | B65D 5/46016 229/117.26 |
| 5,876,081 A * | 3/1999 | Melody | .............. | B65D 5/46032 229/117.26 |
| 5,975,415 A | 11/1999 | Zehnal | | |
| 6,116,424 A * | 9/2000 | Leu | ...................... | B65D 33/001 206/554 |
| 6,279,819 B1 | 8/2001 | Schultz | | |

(Continued)

*Primary Examiner* — Anthony Stashick
*Assistant Examiner* — Kaushikkumar Desai
(74) *Attorney, Agent, or Firm* — Sterne, Kessler, Goldstein & Fox P.L.L.C.

(57) ABSTRACT

In some of the embodiments described, a display apparatus can be applied to a package to facilitate hanging of the package. The display apparatus may also seal the package. In some embodiments, the display apparatus has three flat panel-like branches, where an upper branch protrudes upwards and has a hole from which the display apparatus can be hung, a lower branch protrudes downwards and can be affixed to a tuck flap of a package top, and a closure branch can be rotated downwards to be affixed to an exterior face of the side of the package, thereby sealing it. When the upper branch is hung from a support, the lower branch and closure branch support the package by their affixation thereto, thereby facilitating its display.

16 Claims, 11 Drawing Sheets

(56) References Cited

U.S. PATENT DOCUMENTS

| | | | |
|---|---|---|---|
| 6,305,597 B1 | 10/2001 | Donegan et al. | |
| 6,375,239 B1 * | 4/2002 | Reed | B65D 5/4208 |
| | | | 229/117.23 |
| 6,769,541 B1 * | 8/2004 | Carriere | A47F 5/0043 |
| | | | 206/348 |
| 6,840,437 B2 * | 1/2005 | Chen | B65D 5/22 |
| | | | 229/120.17 |
| 6,994,307 B2 * | 2/2006 | Curtsinger | B23D 59/00 |
| | | | 206/806 |
| 7,178,712 B2 | 2/2007 | Schultz et al. | |
| 8,434,803 B1 * | 5/2013 | An | B25J 1/04 |
| | | | 294/212 |
| 2008/0110778 A1 | 5/2008 | Gelardi et al. | |
| 2009/0236351 A1 * | 9/2009 | Chu | B65D 25/22 |
| | | | 220/751 |
| 2013/0228491 A1 * | 9/2013 | Glass | B65D 73/0007 |
| | | | 206/525 |

* cited by examiner

DISPLAY APPARATUS

BACKGROUND

Field

Embodiments of the present invention relate to a display apparatus. Specifically, a display apparatus for affixation to an item to hang the item from the display apparatus.

Background

Retail stores and other establishments often possess items that are desired to be displayed to those who would view the items, for example, shoppers. These items may be displayed for a variety of reasons, such as, for example, being offered for sale, presented for their aesthetic characteristics, presented as memorabilia or collectibles, other reasons, or a combination of such reasons. In some cases, such displayed items are packages (e.g., boxes), or are contained within packages.

It may be desired to hang a package for display, and to maintain the package in a closed configuration. It may also be desired to facilitate opening of the package by a user, and to make evident that the package has been opened, after it has been.

BRIEF SUMMARY

At least some of the embodiments of the present invention satisfy present needs and provide advantages as will be made apparent by the description that follows. In a retail or other environment in which it is desired to display an item, a person may want to place an item in a display case, place the item on a shelf, or hang the item for display to or access by a potential purchaser. In some cases, a person may find it desirable to use an apparatus to assist such display, particularly where the item desired to be hung is not otherwise conducive to hanging, such as a box. According to embodiments described herein, a display apparatus can be applied to a box or other package to facilitate such hanging. The display apparatus may also seal the box or other package. In some embodiments, the display apparatus has three flat panel-like branches, where an upper branch protrudes upwards and has a hole from which the display apparatus can be hung, a lower branch protrudes downwards and can be affixed to a tuck flap of a package top, and a closure branch can be rotated downwards to be affixed to an exterior face of the side of the package, thereby sealing it. When the upper branch is hung from a support, the lower branch and closure branch support the package by their affixation thereto, thereby facilitating its display.

To facilitate opening of the package, the closure branch may have a tear-away region that releases the closure branch (or at least the portion of the closure branch beyond the tear-away region) from the balance of the display apparatus, thereby freeing the package top relative to the side of the package, allowing it to be opened.

Since the display apparatus is separate from and adhered to the package, it can be selectively applied, thereby allowing a retailer or other person to apply it only when desired. For example, only to those packages to be hung, or where sealing is desired. If the package is to be displayed on a shelf or in a display case, use of display apparatus may not be desired. The independence of display apparatus from the package allows the retailer to apply the display apparatus selectively when desired.

Some embodiments of the present invention provide a display apparatus including an axis, an upper branch extending from the axis for hanging the display apparatus, a lower branch extending from the axis for affixture to a tuck flap of a package top, and a closure branch extending from the axis for affixture to an exterior of the package side wall, wherein the closure branch comprises a tear-away region.

Some embodiments of the present invention provide a display apparatus including a first panel including an upper portion and a lower portion wherein the upper portion defines an opening therethrough, a second panel including an upper portion and a lower portion wherein the second panel lower portion is coupled to the first panel lower portion and wherein the second panel upper portion comprises a tear-away region bounded by a pair of tear paths extending between edges of the upper portion, a first adhesive disposed on the first panel lower portion on a side of the first panel facing away from the second panel, and a second adhesive disposed on the second panel upper portion, on a side of the second panel facing away from the first panel.

Some embodiments of the present invention provide a display system including a display apparatus including an upper branch, a lower branch, and a closure branch, wherein the display apparatus is movable between a non-use configuration wherein the closure branch is oriented in the same direction as the upper branch, and a use configuration wherein the closure branch is oriented in the same direction as the lower branch, and a package movable between an open and a closed configuration, the package including a package top and a side wall, wherein the lower branch is configured to be affixed to the package top and wherein the closure branch is configured to be affixed to the package side wall when the package is in the closed configuration and the display apparatus is in the use configuration, wherein the package is sealed in the closed configuration by the display apparatus in the use configuration.

Some embodiments of the present invention provide a method for displaying an item, the method including affixing a display apparatus to a tuck flap of a top of a package, closing the top of the package, and affixing the closure branch to an exterior surface of a side wall of the package, wherein the closure branch comprises a tear-away region and an adhesion region, wherein the tear-away region is disposed between the adhesion region and the balance of the display apparatus, and wherein the closure branch is affixed to the exterior surface of the side wall of the package by affixing the adhesion region to the exterior surface of the side wall of the package.

Additional features and embodiments will be set forth in the description that follows, and in part will be apparent from the description, or may be learned by practice of the invention. Both the foregoing general description and the following detailed description are exemplary and explanatory.

BRIEF DESCRIPTION OF THE FIGURES

The accompanying figures, which are incorporated herein, form part of the specification and illustrate embodiments described herein. Together with the description, the figures further serve to explain the principles of and to enable a person skilled in the relevant arts to make and use the invention.

DETAILED DESCRIPTION

The following detailed description refers to the accompanying figures, which illustrate exemplary embodiments. Other embodiments are possible. Modifications can be made to the exemplary embodiments described herein without departing from the spirit and scope of the present invention. Therefore, the following detailed description is not meant to be limiting. The operation and behavior of the embodiments presented are described with the understanding that modifications and variations may be within the scope of the present invention.

Figure 1:
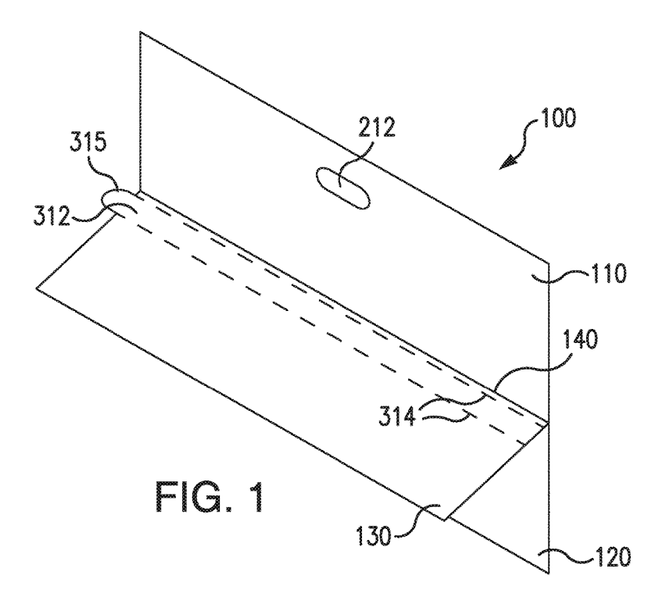
FIG. 1 illustrates a front perspective view of a display apparatus.
Figure 2:
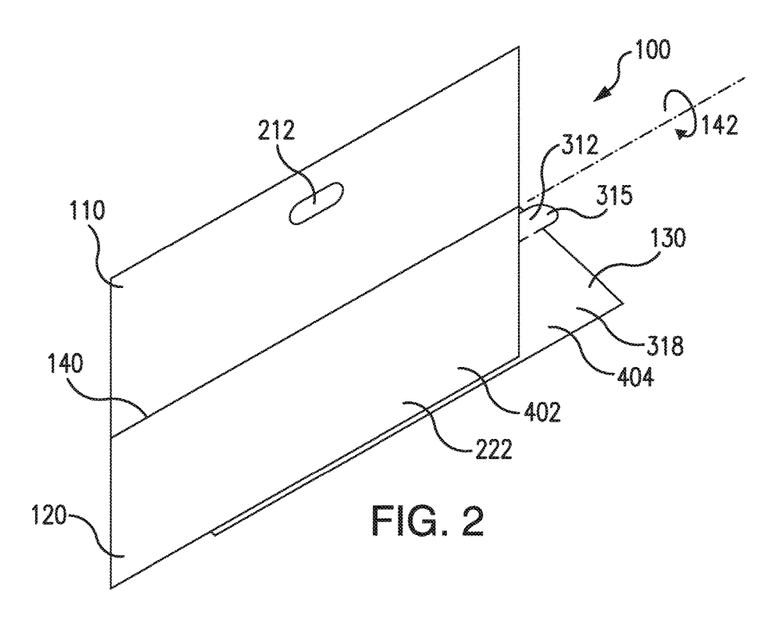
FIG. 2 illustrates a rear perspective view of the display apparatus of FIG. 1.
Figure 3:
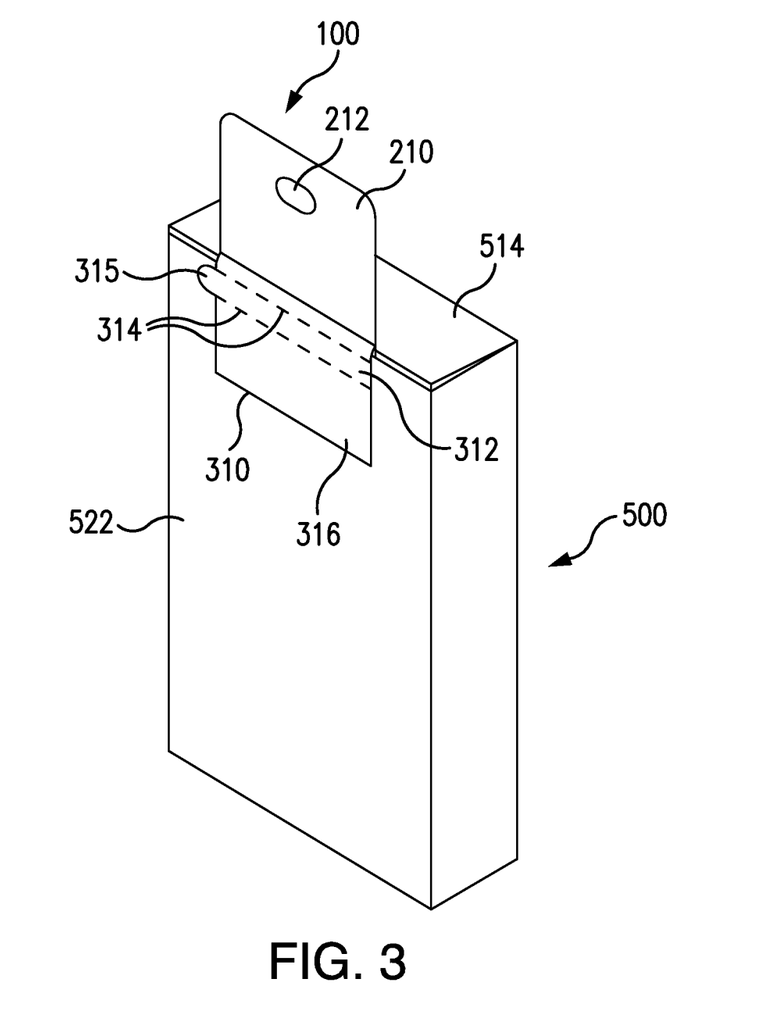
FIG. 3 illustrates a perspective view of the display of FIG. 1 apparatus affixed to a package.
Figure 4:
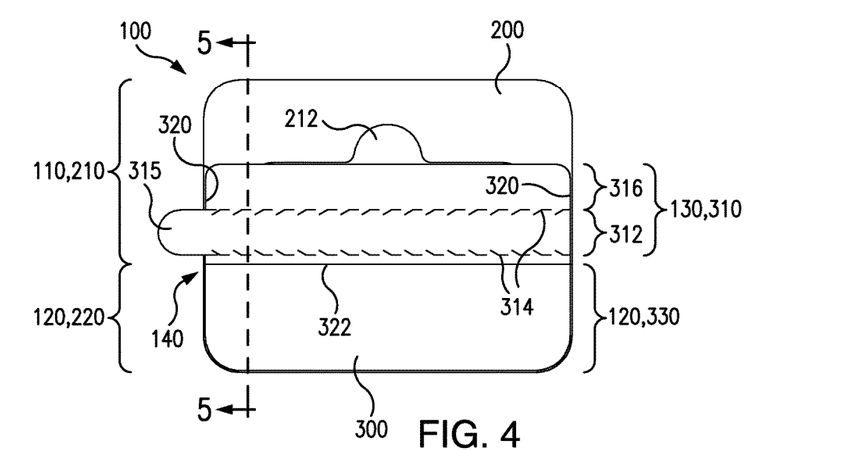
FIG. 4 illustrates a front view of the display apparatus of FIG. 1 in a pre-use configuration.
Figure 5:
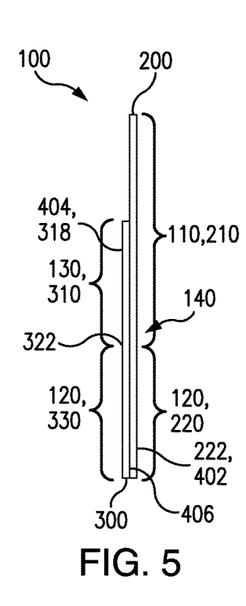
FIG. 5 illustrates a cross-sectional side view of the display apparatus of FIG. 1 in a pre-use configuration.
Figure 6:
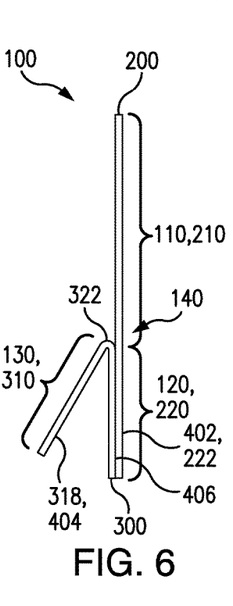
FIG. 6 illustrates a cross-sectional side view of the display apparatus of FIG. 1 in an intermediate configuration.
Figure 7:
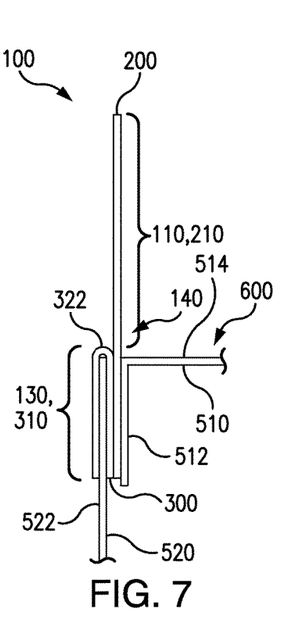
FIG. 7 illustrates a cross-sectional side view of the display apparatus of FIG. 1 in a use configuration.
Figure 8:
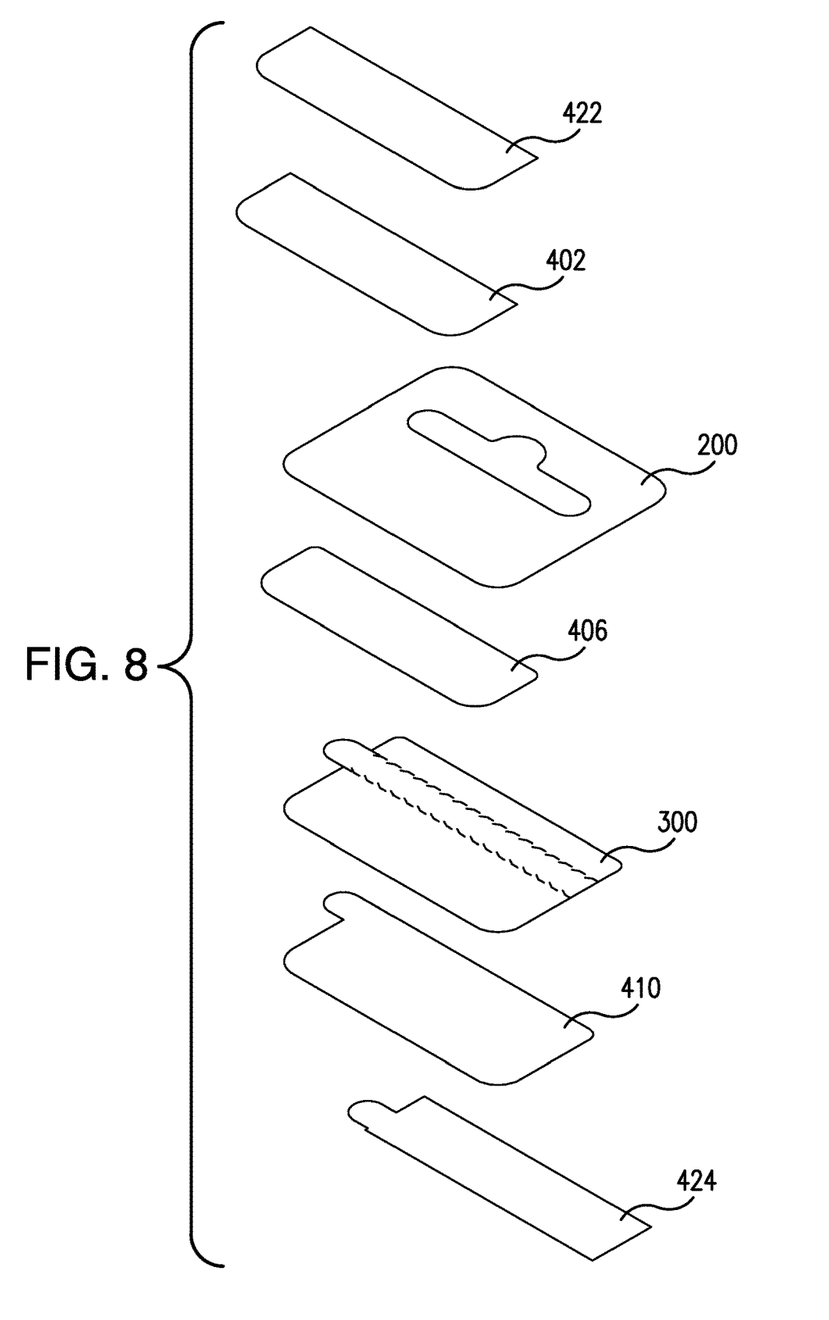
FIG. 8 illustrates an exploded view of the display apparatus of FIG. 1.

FIGS. 1 and 2 depict a display apparatus 100 alone, and FIG. 3 depicts display apparatus 100 affixed to a package 500 according to an exemplary embodiment of the present invention. FIG. 4 depicts a front view of display apparatus 100 alone, in a pre-use configuration. FIGS. 5-7 depict cross-sectional side views of display apparatus 100 transitioning from a pre-use configuration in FIG. 5 (showing a cross-section taken along line 5-5 of FIG. 4) to a use configuration in FIG. 7 showing display apparatus 100 affixed to portions of package 500. FIG. 8 depicts an exploded view of display apparatus 100.

Display apparatus 100 can be used to display an item, such as package 500 or an item contained therein. In some embodiments, package 500 may be a box. The displayed item, however, does not have to be or be contained within a package (e.g., a box), but can be any item to which display apparatus 100 can be affixed. In such embodiments, display apparatus 100 may be affixed directly to the item.

In some embodiments, display apparatus 100 includes an opening 212 in an upper portion thereof, and is affixed to package 500 via an adhesive. In this way, package 500 can be hung from display apparatus 400 by, for example, placing display apparatus 400 such that a support (e.g., an elongated member) of a display structure extends through opening 212, thereby supporting display apparatus 100 and package 500 through opening 212.

In a retail environment, or any other display environment, it may be desired that package 500 be sealed in a closed configuration, and remain in a closed configuration for a time (e.g., until purchased). In some embodiments, display apparatus 100 includes a sealing mechanism (e.g., a closure branch 130) that maintains package 500 in such closed configuration. At a later time, a user (e.g., a purchaser) may desire to open package 500. In some embodiments, display apparatus 100 includes an opening mechanism (e.g., a tear away region 312) to facilitate such opening. A missing torn-away region of display apparatus 100 indicates to a viewer that package 500 has been opened since the time that display apparatus 100 was affixed thereto. In this way, display apparatus 100 can act as a "tamper-proof" seal, alerting a potential purchaser (or retail clerk, or other person) that package 500 has been opened, and thus that its contents may have changed since display apparatus 100 was affixed.

In some embodiments, display apparatus 100 includes three branches. For example, as shown in FIGS. 1 and 2, display apparatus 100 may include an upper branch 110 from which display apparatus 100 may be hung (e.g., by opening 212), a lower branch 120 for affixture to package 500, and a closure branch 130 also for affixture to package 500 to close or seal package 500. Each branch 110, 120, 130 may extend out from an axis 140, and at least one branch (e.g., closure branch 130) may rotate about axis 140. Such rotation can facilitate closure and sealing action of closure branch 130.

In some embodiments, each of branches 110, 120, 130 is a flat panel, as shown in FIGS. 1 and 2. Such flat panels can provide surface area for adhering to package 500. The flat panels forming branches 110, 120, 130 can be formed, for example, of plastic (e.g., polyethylene terephthalate (PET)), and may be monolithic with each other. In some embodiments, branches 110, 120, 130 are formed from two or more discrete pieces coupled together (e.g., adhered at an abutting or overlapping area).

In some embodiments, one or more surfaces of branches 110, 120, 130 have adherence properties. In particular, lower branch 120 and closure branch 130 may include an adhesive on one of their faces. For example, lower branch 120 may include adhesive face 222 having a first adhesive 402, and closure branch 130 may include adhesive face 318 having a second adhesive 404. These adhesives may be a property of the material forming lower branch 120 or closure branch 130, or may be additional elements applied to the surface of lower branch 120 or closure branch 130. In some embodiments, adhesive faces 222 and 318 face the same angular direction 142 about axis 140 (e.g., as shown in FIG. 2), to facilitate the use of display apparatus 100 to seal package 500.

In a use configuration (e.g., as shown in FIG. 3), adhesive face 222 of lower branch 120 may be affixed to a tuck flap 512 of package top 510 of package 500 (e.g., via first adhesive 402). Also, adhesive face 318 of closure branch 130 may be affixed to an exterior surface 522 of a package side wall 520 of package 500. When so affixed, relative movement of lower branch 120 and closure branch 130 may be limited, and may in turn limit relative movement of package top 510 and package side wall 520, thereby preventing opening of package top 510 of package 500 such that package 500 is maintained in a sealed configuration. When in the use configuration sealing package 500, opening 212 of upper branch 110 of display apparatus 100 may be positioned over a display hook or other support to hang display apparatus 100 (and package 500) therefrom. In this way, package 500 can be displayed (e.g., for purchase in a retail environment) while remaining sealed to protect its contents from tampering. Further, since tuck flap 512 may be inserted within package side wall 520 in the use configuration, it can be hidden from view. In other words, in some embodiments display apparatus 100 is not attached to a top surface of package 500 (e.g., upper surface 514), thereby minimizing the visual effect of display apparatus on package 500.

In some embodiments, display apparatus 100 may include a tear-away region 312 to facilitate opening of sealed package 500 (e.g., after purchase by a customer). For example, closure branch 130 may be composed of tear-away region 312 and an adhesion region 316. In some embodiments, as shown, for example, in FIG. 4, tear-away region 312 is interposed between adhesion region 316 and axis 140. In some embodiments, adhesive face 318 of closure branch 130 only includes adhesive properties in adhesion region 316, or includes greater adhesion properties in adhesion region 316 than in tear-away region 312. In this way, tear-away region 312 can be removed (e.g., by a pulling action) from display apparatus 100 and package 500, while adhesion region 316 remains affixed to package 500. After tear-away region 312 is removed, closure branch 130 (or at least the portion of disclosure branch 130 beyond tear-away region 312) is detached from the balance of display apparatus 100, and thus relative motion of lower branch 120 and closure branch 130 is no longer limited by their connection. Similarly, relative motion of package top 510 and package side wall 520 is no longer limited by display apparatus 100, and package 500 can be opened. Since upper branch 110 and lower branch 120 of display apparatus 100 may remain attached to package top 510, upper branch 110 can be used to facilitate opening of package 500. For example, pulling upward on upper branch 110 may cause tuck flap 512 of package top 510 to move away from package side wall 520 due to the attachment of lower branch 120 and tuck flap 512, thereby opening package 500.

In some embodiments, upper branch 110, lower branch 120, and closure branch 130 are formed from a plurality of panels. Such panels may be nominally flat and plastically deformable. For example, as shown in FIGS. 4-7, a first panel 200 may be coupled to a second panel 300. Together, first panel 200 and second panel 300 may form display apparatus. First panel 200 may include a first panel upper portion 210 and a first panel lower portion 220. Second panel 300 may include a second panel upper portion 310 and a second panel lower portion 330. In some embodiments, as shown in FIGS. 5-7, first panel lower portion 220 and second panel lower portion 330 may be affixed to each other, and may together form lower branch 120 of display apparatus 100. First panel upper portion 210 may extend up from first panel lower portion 220, and may form upper branch 110 of display apparatus 100. Second panel 300 may include a fold line 322 about which second panel upper portion 310 may rotate to form closure branch 130 of display apparatus 100. Fold line 322 may correspond to axis 140.

First panel 200 and second panel 300 may be formed of rigid plastic (e.g., PET) having sufficient rigidity to maintain its shape when subjected to forces normally applied during handling (e.g., first panel 200 and second panel 300 may have greater rigidity than, for example, cellophane or paper). In embodiments where first panel 200 and second panel 300 are formed of plastic, such plastic may have a higher strength or resistance to tearing than material of package 500, thereby providing a strong seal and reliable strength for hanging package 500 from display apparatus 100. In some embodiments, first panel 200 and second panel 300 are transparent (e.g., formed of transparent plastic). In this way, display apparatus 100 does not obscure package 500 and minimizes any distracting visual impact of display apparatus 100 on package 500.

In other words, upper branch 110 may be formed monolithically with a first portion of lower branch 120 and closure branch 130 may be formed monolithically with a second portion of lower branch 120, while the first and second portions of lower branch 120 are not monolithic, but are otherwise coupled together to form lower branch 120.

In some embodiments, first panel lower portion 220 and second panel lower portion 330 may be affixed together by, for example, an adhesive (e.g., third adhesive 406), a welding process, a co-molding process, a staple, a rivet, or tape.

Second panel upper portion 310 may form closure branch 130, and may include tear-away region 312 and adhesion region 316. Tear-away region 312 may be disposed between adhesion region 316 and fold line 322. In some embodiments, adhesion region 316 is arranged at the free end of second panel upper portion 310.

Second panel upper portion 310 may be free from direct attachment to first panel 200, but may be indirectly attached thereto through second panel lower portion 330 (e.g., via third adhesive 406 as shown in FIGS. 5 and 6). Second panel upper portion 310 may form closure branch 130. Being free from such direct attachment, second panel upper portion 310 can rotate about axis 140 by folding action of second panel 300 at fold line 322. In this way, display apparatus 100 can transition (1) from a pre-use configuration (FIG. 5) where second panel upper portion 310 extends upward adjacent to and in parallel with first panel upper portion 210; (2) through a transition configuration (FIG. 6) where second panel upper portion is folded down and away from first panel upper portion 210 at fold line 322 about axis 140; (3) to a use configuration where second panel upper portion 310 extends downward adjacent to and in parallel with first panel lower portion 220. In the use configuration, package side wall 520 may be interposed between second panel upper portion 310 and second panel lower portion 330. In the use configuration package 500 may be retained and sealed by attachment of exterior surface 522 of package side wall 520 to adhesion region 316 of adhesive face 318 of second panel upper portion and by attachment of tuck flap 512 of package top 510 to adhesive face 222 of first panel lower portion 220, as shown in FIG. 7.

Tear-away region 312 of second panel upper portion 310 may be configured to tear away from the balance of display apparatus 100, to separate second panel upper portion 310 from second panel lower portion 330 as described above. Such separation may leave adhesion region 316 of second panel upper portion 310 affixed to package 500, but it will be separate from the balance of display apparatus 100 (also still affixed to package 500) due to the absence of tear-away region 312. This can allow package top 510 to be opened freely. In some embodiments, tear-away region 312 extends the entire length of second panel upper portion 310 (e.g., in a direction parallel to axis 140 or fold line 322) between edges 320 of second panel upper portion 310.

In some embodiments, to facilitate tearing-away of tear-away region 312, tear-away region 312 may be bounded and defined by defined tear paths 314 to facilitate and guide tearing away of tear-away region 312. In some embodiments, tear paths 314 may be weaker than the balance of second panel upper portion 310, and may be formed by, for example, perforations, scores, or pre-stressed areas of second panel upper portion 310. Since weakened tear paths 314 are weaker than the balance of second panel upper portion 310, second panel upper portion 310 will tend to tear along weakened tear paths 314 when sufficient force is applied.

Figure 19:
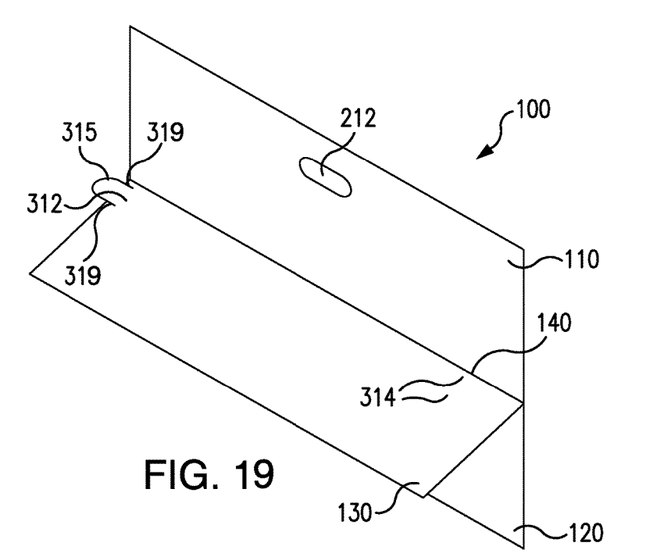
FIG. 19 illustrates a front perspective view of another embodiment of a display apparatus.
Figure 20:
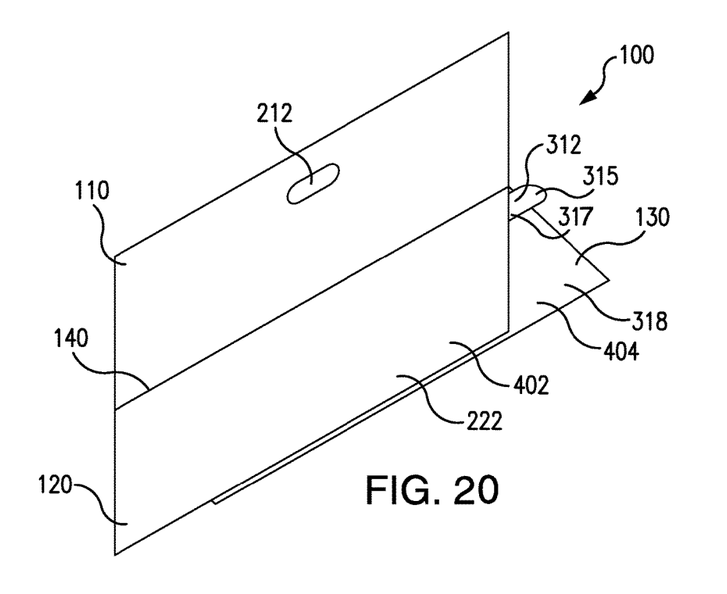
FIG. 20 illustrates a rear perspective view of the display apparatus of FIG. 19.

In some embodiments, tear paths 314 are not weaker than the balance of second panel upper portion 310, and are not defined by perforations, scores, or pre-stressed areas. In such embodiments, tear-away region 312 may be reinforced by a nylon layer 317 laminated within the bounds of tear paths 314 (see FIGS. 19 and 20). Nylon layer 317 may be more resistant to tearing than second panel upper portion 310, and may be disposed on either adhesive face 318 (outside of adhesion region 316 and within tear-away region 312) or the side of second panel upper portion 310 opposite adhesive face 318. Nylon layer 317 may strengthen and reinforce tear-away region 312 relative to the balance of second panel upper portion 310. In this way, tear-away region 312 tears away along tear paths 314 when sufficient force is applied, due to the change in relative material strength along tear paths 314. In some embodiments, to initiate tearing along non-weakened tear paths 314, second panel upper portion 310 may include small slits 319 at corresponding ends of tear paths 314 to direct initial tearing along tear paths 314. Nylon layer 317 may have straight edges defining tear paths 314 so that tear-away region 312 tears away cleanly leaving a straight edge, to minimize interference with an aesthetic of package 500.

In some embodiments, tear-away region includes a tab 315 to facilitate tearing away of tear-away region 312. For example, a user may grasp tab 315 and pull it away from package 500. If sufficient force is applied, second panel upper portion 310 will begin to tear along tear paths 314. Once tear paths 314 are torn through, tear-away region 312 may be freed from attachment to the balance of display apparatus 100, which will cause package 500 to become unsealed, and thus openable.

Because package 500 becomes unsealed after tear-away region 312 has been torn away, package 500 cannot be re-sealed in the same manner. Thus, display apparatus 100 can make visibly evident that package 500 has previously been un-sealed by the absence of tear-away region 312. This may be desirable to provide visual indication that contents of package 500 may have been changed or removed since it was sealed, or that package 500 has been otherwise tampered with.

To effect display of package 500, first panel upper portion 210 may include opening 212, through which a support may be extended, to hang package 500 from such support when package 500 is affixed to display apparatus 100. First panel upper portion 210 may form upper branch 110. Opening 212 is optional, and may be omitted where hanging is effected by other means (e.g., a clip holding first panel upper portion 210) or when package 500 is not to be hung, but upper branch 110 is desired to allow for easy manipulation by a person. In some embodiments, display apparatus 100 does not include upper branch 110 for first panel upper portion). In such embodiments, display apparatus 100 remains able to perform sealing functions using lower branch 120 and closure branch 130 as described herein.

Display apparatus 100 may be affixed to package 500 by, fir example, adhesive. Such adhesive may be separate from other elements of display apparatus 100 (e.g., upper branch 110, lower branch 120, closure branch 130, first panel 200, second panel 300) or may be an inherent property thereof. In some embodiments, first adhesive 402 is disposed on adhesive face 222 of first panel lower portion 220 (e.g., on the side of first panel 200 facing away from second panel 300), and is used to affix display apparatus to tuck flap 512 of package top 510. In some embodiments, second adhesive 404 is disposed in adhesion region 316 of adhesive face 318 of second panel upper portion 310 (e.g., on the side of second panel 300 facing away from first panel 200), and is used to affix display apparatus 100 to exterior surface 522 of package side wall 520. In some embodiments, second adhesive 404 is disposed outside of tear-away region 312 of second panel upper portion 310. In some embodiments, third adhesive 406 is disposed between first panel lower portion 220 and second panel lower portion 330, and is used to affix first panel lower portion 220 to second panel lower portion 330.

In some embodiments, an adhesive is covered by a release liner, to protect the adhesive from adhering to anything before intended. For example, as shown in the exploded view of FIG. 8, first release liner 422 may be disposed over first adhesive 402, which is disposed on or incorporated in first panel 200. Second release liner 424 may be disposed over second adhesive 404 (not shown in FIG. 8), which is disposed on or incorporated in second panel 300. Adhesives described herein may be, for example, a pressure-sensitive adhesive, a double-sided adhesive tape, or glue. In some embodiments, the adhesives may be transparent to minimize interference with the aesthetic of package 500. Release liners described herein may be formed of for example, plastic or paper, and may be thinner and more flexible than first panel 200 and second panel 300.

In some embodiments, the entire outer face of second panel 300 may be adhesive (e.g., second adhesive 404). In such case, in order to limit adhesive properties outside adhesion region 316, a mask 410 may be applied to second panel 300 (e.g., over a portion of second adhesive 404 outside of adhesion region 316) as shown in FIG. 8, to deaden the adhesive properties of second panel 300 outside adhesion region 316. Mask 410 may be non-adhesive on at least one side thereof. In some embodiments second release liner 424 may extend over at least a portion of mask 410 (e.g., over tear-away region 312 and tab 315, to allow easy peeling away of second release liner 424 at tab 315).

Figure 9:
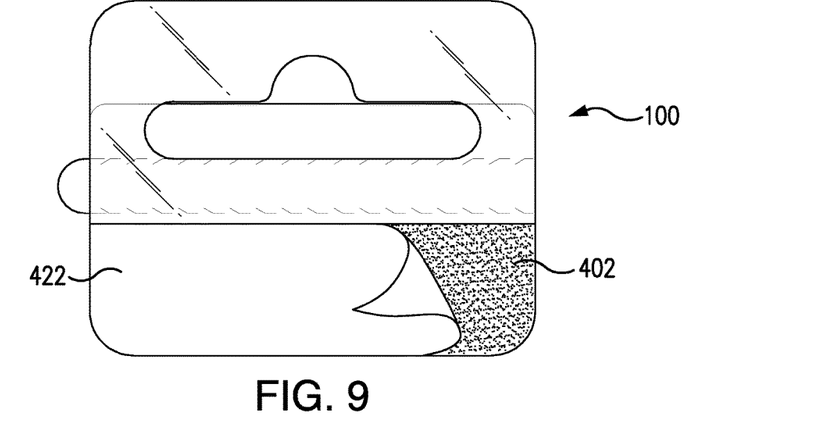
FIGS. 9-18 illustrate stages of use of the display apparatus of FIG. 1.
Figure 10:
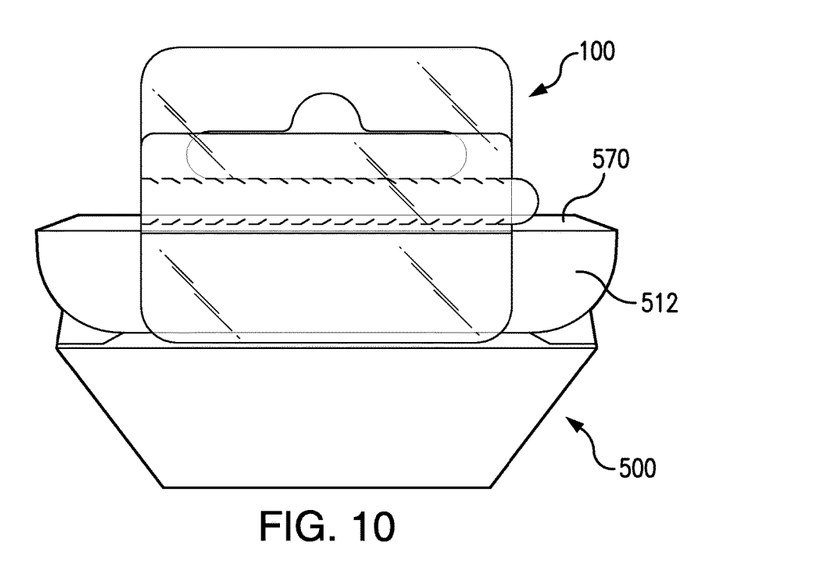
Figure 11:
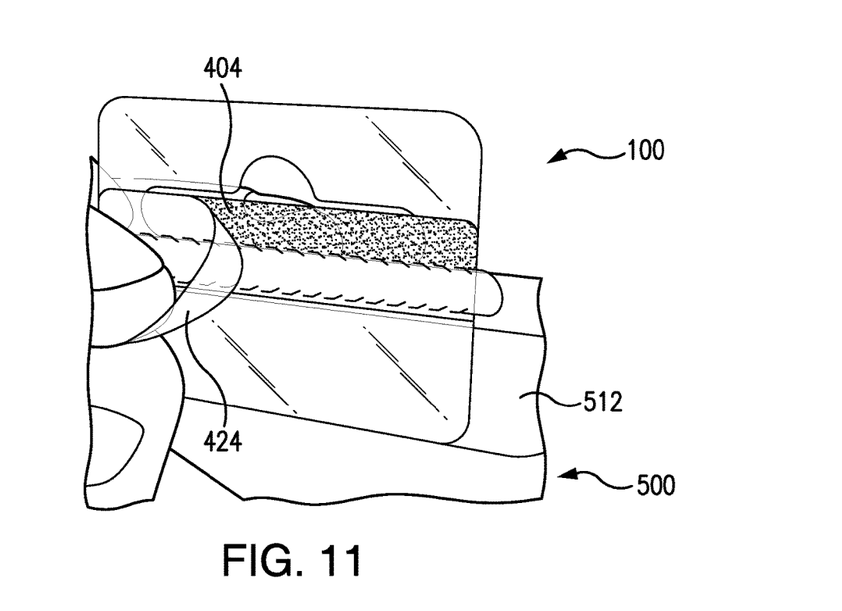
Figure 12:
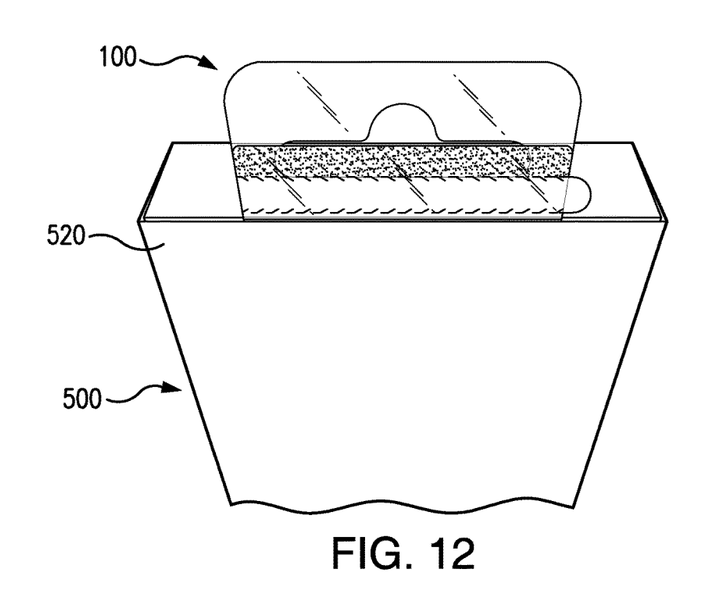
Figure 13:
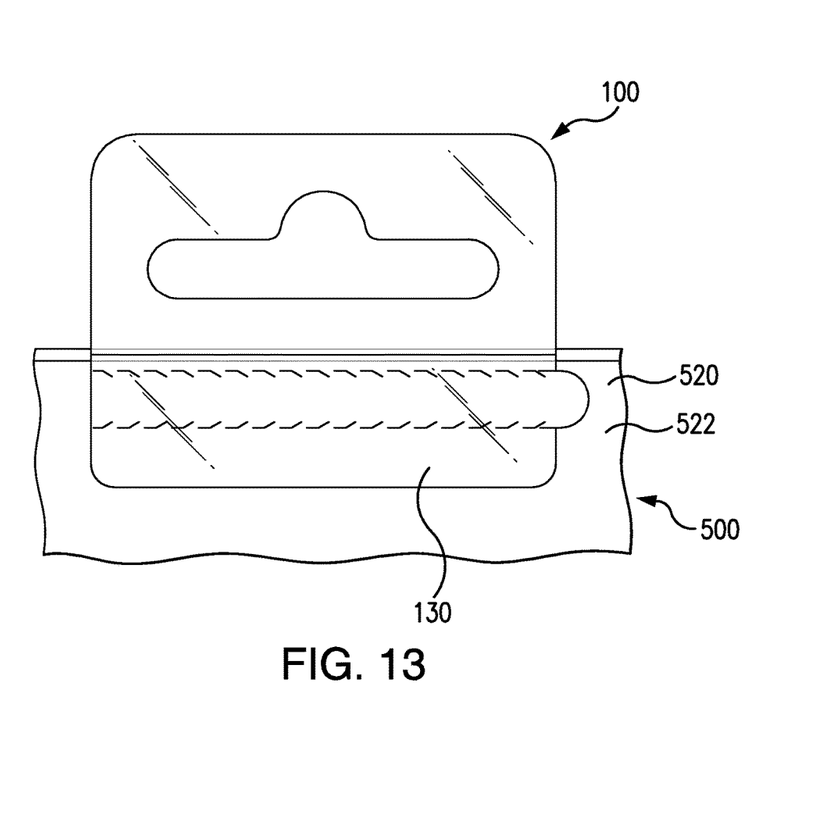
Figure 14:
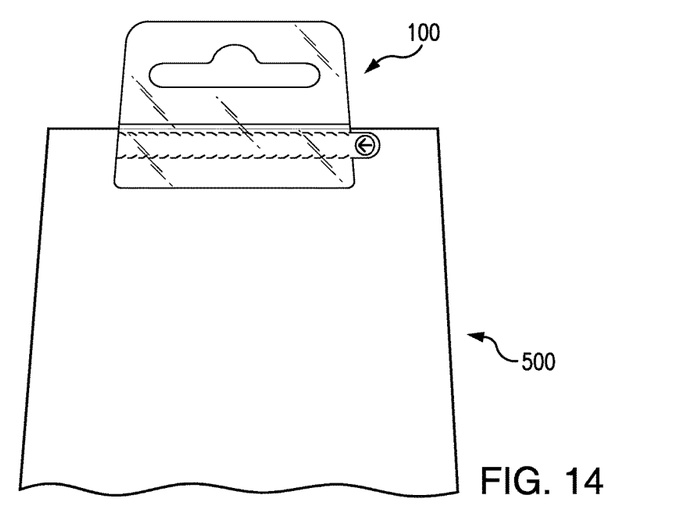
Figure 15:
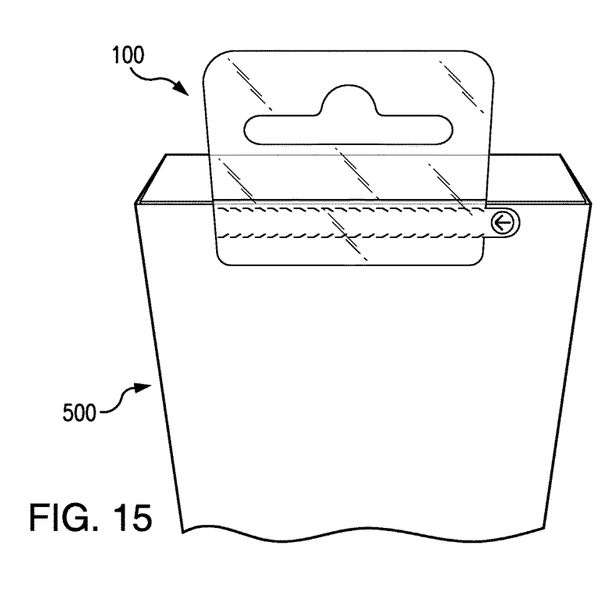

FIGS. 9-18 depict use of display apparatus 100. To use display apparatus 100, a person may, for example, remove first release liner 422 to expose first adhesive 402, as shown in FIG. 9. This may be accomplished by peeling away first release liner 422. Then a person may affix display apparatus 100 to tuck flap 512 of package top 510 using first adhesive 402, as shown in FIG. 10. This may be accomplished by aligning first adhesive 402 with tuck flap 512 and applying pressure. Then a person may remove second release liner 424 to expose second adhesive 404, as shown in FIG. 11. This may be accomplished by peeling away second release liner 424. Then a person may close package 500, as shown in FIG. 12. This may be accomplished by tucking tuck flap 512 inside of package side wall 520. Then a person may affix closure branch 130 to exterior surface 522 of package side wall 520, as shown in FIG. 13. This may be accomplished by folding closure branch 130 over package side wall 520, and applying pressure. Then, display apparatus 100 is in a use configuration sealing package 500, as shown in FIGS. 14 and 15.

Figure 16:
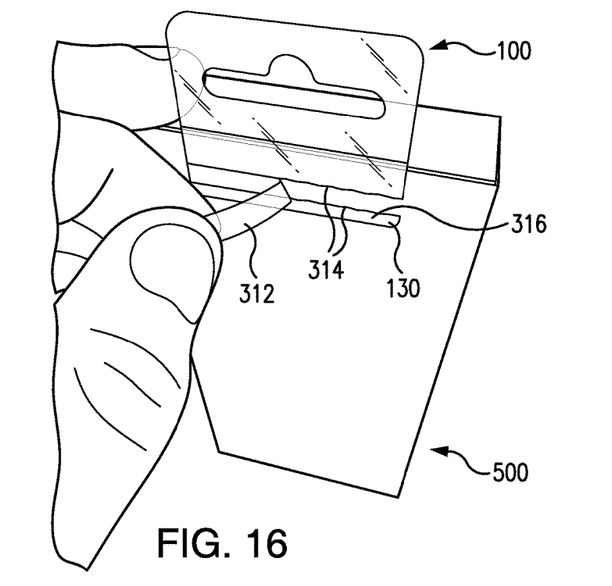
Figure 17:
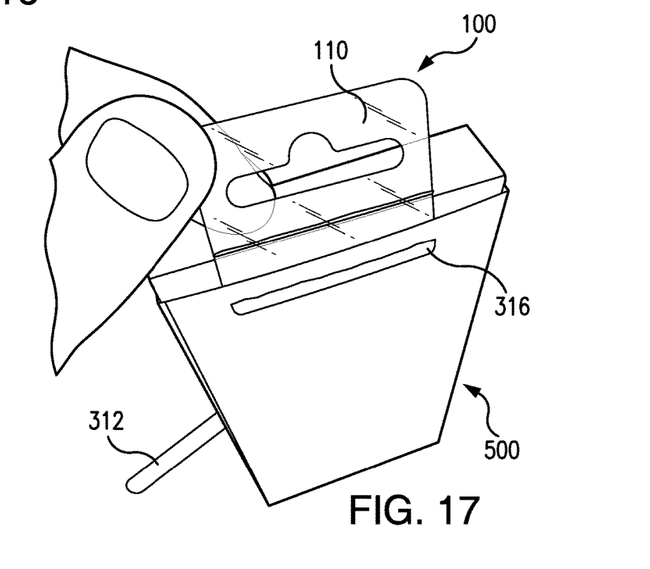
Figure 18:
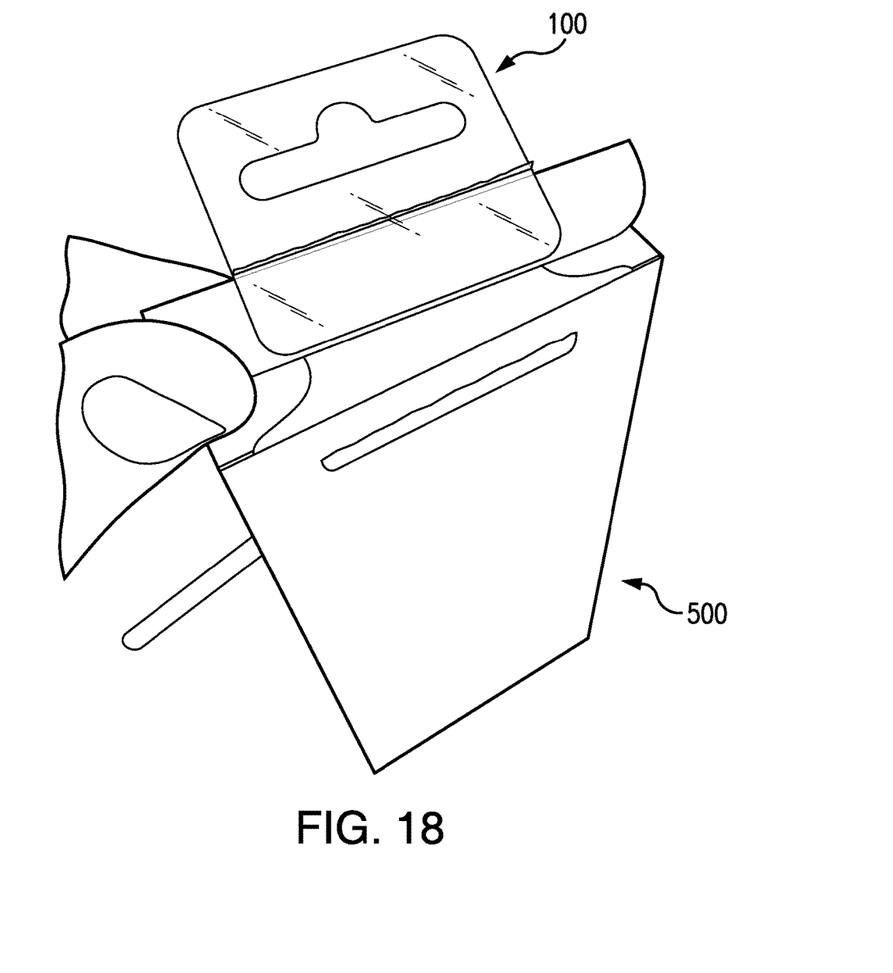

To un-seal package 500, a person may grasp tab 315 of tear-away region 312 of closure branch 130 and pull tab 315 away from package 500 with sufficient force to cause tear-away region 312 to tear away from the balance of closure branch 130 along tear paths 314, as shown in FIG. 16. Then, a person may pull upward on upper branch 110 to open package 500, as shown in FIGS. 17 and 18.

The foregoing description of the specific embodiments of the display apparatus described with reference to the figures will so fully reveal the general nature of the invention that others can, by applying knowledge within the skill of the art, readily modify and/or adapt for various applications such specific embodiments, without undue experimentation, without departing from the general concept of the present invention.

It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present invention. The elements of the embodiments presented above are not necessarily mutually exclusive, but may be interchanged to meet various needs as would be appreciated by one of skill in the art. It is to be understood that the phraseology or terminology used herein is for the purpose of description and not of limitation. The breadth and scope of the present invention should not be limited by any of the above-described exemplary embodiments, but should be defined only in accordance with the following claims and their equivalents.

What is claimed is:

1. A display apparatus for affixture to a package, the display apparatus comprising:
 an upper branch extending from an axis, for hanging the display apparatus;
 a lower branch extending from the axis, for affixture to a tuck flap of a package top, wherein the lower branch comprises an adhesive face; and
 a closure branch extending from the axis, for affixture to an exterior of the package side wall, wherein the closure branch comprises a tear-away region and an adhesive face,
 wherein the adhesive face of the closure branch faces toward the lower branch and away from the upper branch about the axis;
 wherein the adhesive face of the lower branch and the adhesive face of the closure branch face the same angular direction about the axis.

2. The display apparatus of claim 1, wherein the closure branch comprises an adhesion region, and
 wherein the tear-away region of the closure branch is disposed between the adhesion region and the axis.

3. The display apparatus of claim 2, wherein the adhesion region of the closure branch comprises the adhesive face of the closure branch.

4. The display apparatus of claim 1, wherein the display apparatus is formed of plastic.

5. The display apparatus of claim 1, wherein the display apparatus is transparent.

6. A display apparatus, the display apparatus comprising:
 a first panel comprising an upper portion and a lower portion, wherein the upper portion defines an opening therethrough;
 a second panel comprising an upper portion and a lower portion, wherein the second panel lower portion is coupled to the first panel lower portion, and wherein the second panel upper portion comprises a tear-away region bounded by a pair of tear paths extending between edges of the upper portion;
 a first adhesive disposed on the first panel lower portion, on a side of the first panel facing away from the second panel; and
 a second adhesive disposed on the second panel upper portion, on a side of the second panel facing away from the first panel,
 wherein the second panel is disposed entirely on one side of the first panel.

7. The display apparatus of claim 6, wherein the second adhesive is disposed outside the tear-away region.

8. The display apparatus of claim 6, comprising:
 a mask disposed over the second adhesive to decrease the adhesion thereof,
 wherein the second panel comprises an adhesion region disposed above the tear-away region, and
 wherein the mask is disposed outside the adhesion region.

9. The display apparatus of claim 6, further comprising a third adhesive disposed between the first panel lower portion and the second panel lower portion.

10. The display apparatus of claim 6, comprising:
 a first release liner covering at least a portion of the first adhesive, and
 a second release liner covering at least a portion of the second adhesive.

11. A display system comprising:
 a display apparatus comprising an upper branch, a lower branch, and a closure branch, wherein the display apparatus is movable between a non-use configuration wherein the closure branch is oriented in the same direction as the upper branch, and a use configuration wherein the closure branch is oriented in the same direction as and parallel to the lower branch; and
 a package movable between an open and a closed configuration, the package comprising a tuck flap and a side wall, wherein the tuck flap and the side wall are parallel to each other when the package is in the closed configuration,
 wherein the lower branch is affixed to the tuck flap and disposed between the tuck flap and the side wall when the package is in the closed configuration and the display apparatus is in the use configuration,
 wherein the closure branch is affixed to the package side wall parallel to the lower branch when the package is in the closed configuration and the display apparatus is in the use configuration, and
 wherein the package is sealed in the closed configuration by the display apparatus in the use configuration.

12. The display system of claim 11, wherein the upper and lower branch extend in opposing directions.

13. The display system of claim 11, wherein a portion of the package side wall is disposed between the lower branch and the closure branch in the use configuration.

14. The display system of claim 11, wherein the display apparatus is not affixed to an upper surface of the package.

15. The display system of claim 11, wherein the lower branch is affixed to the tuck flap by a first adhesive, and
 wherein the closure branch is affixed to the package side wall by a second adhesive.

16. The display system of claim 11, wherein the package is a box.

* * * * *